Dec. 11, 1934.  M. O. SNEDIKER  1,983,821
DIFFERENTIAL THERMOSTAT
Filed July 29, 1933
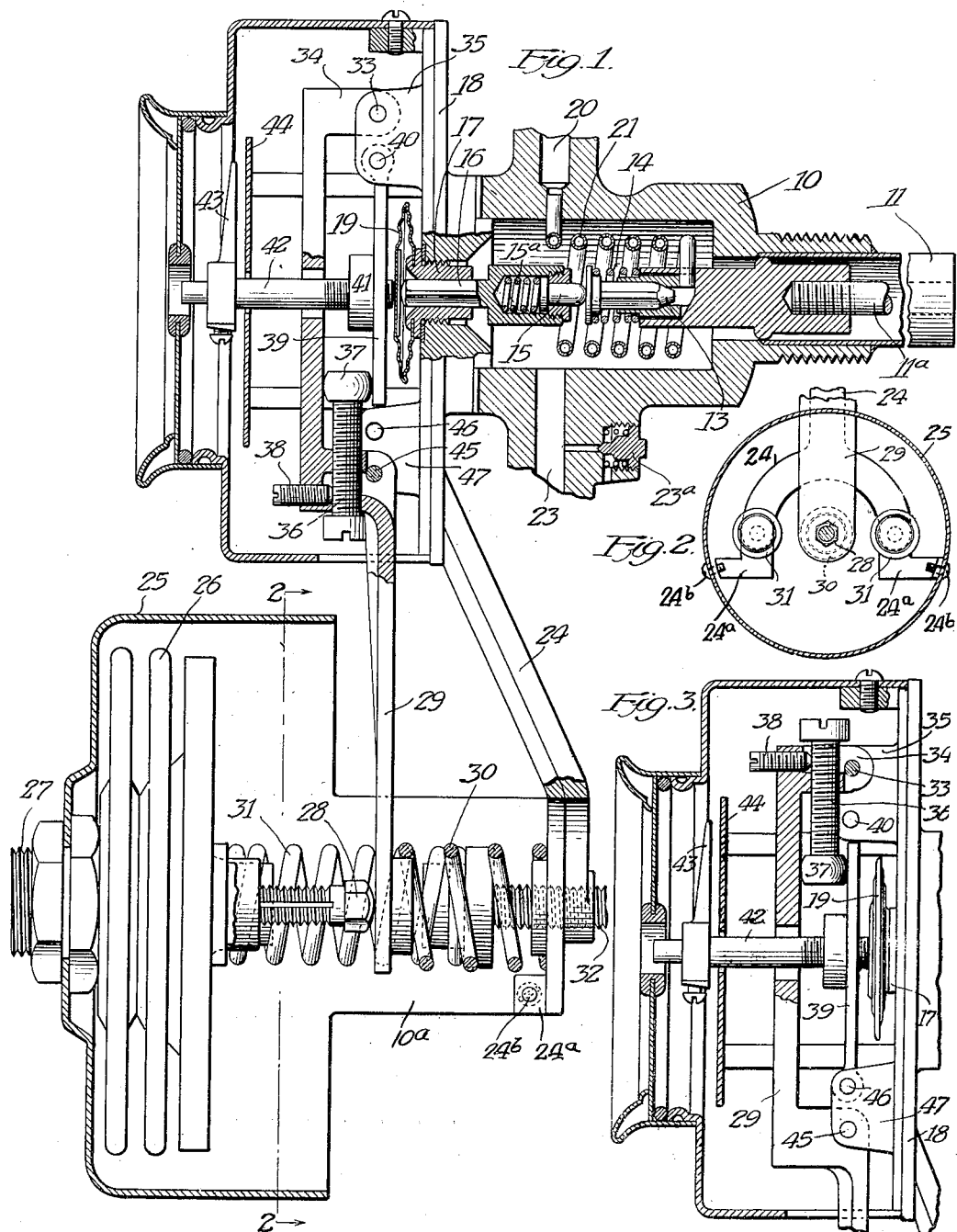
Witness:
R. B. Davison.
Inventor:
Morton O. Snediker
By Murray & Murray
Attys Patented Dec. 11, 1934                                         1,983,821

UNITED STATES PATENT OFFICE 1,983,821

DIFFERENTIAL THERMOSTAT

Morton O. Snediker, Chicago, Ill., assignor to The Powers Regulator Company, Chicago, Ill., a corporation of Illinois Application July 29, 1933, Serial No. 682,803

11 Claims. (Cl. 236—102)

My invention relates to temperature control devices and particularly to primary and secondary controls for thermostats or hygrostats. This application is a continuation in part of my copending application, Serial No. 607,291, filed April 25, 1932.

In general, the present improvement is intended for use in connection with heat or humidity regulation in which primary and secondary control devices are correlated. In other words, a construction in which a primary or master thermostat serves to control the adjustment of a secondary or sub-master thermostat that is directly in control of the supply of the heating or cooling medium.

An object of the invention is to establish certain relations between the master and sub-master thermostats. In one case a user may wish the sub-master to step along with the master permitting a higher and higher temperature as the master thermostat may be similarly affected, or in another case he may wish the sub-master thermostat to require the temperature of its space to step away from the master carrying a lower and lower temperature in a definite proportion to the higher and higher temperature of the space within which the master is located; in other words, an object is to provide a connection between the two thermostats whereby the sub-master is required to follow the master or act oppositely to it and always preserve a certain definite relation.

Specifically the device is intended to provide three features, for example.

First.—Means for changing the ratio of adjustment between the master and sub-master; that is, means whereby a one degree change by the master may be caused to effect, at will, the same change in the sub-master, or a change of two or more degrees in the sub-master, or a change of less than one degree in the sub-master.

Second.—Means whereby the same instrument may be used for a direct acting or reverse acting control by merely shifting the position of certain of the parts. The meaning of the above terms will be explained hereafter.

Third.—Means whereby the range of adjustment may be changed without changing the ratio of adjustment. In other words, this last means is so arranged that if the master records a one degree change from 68 to 69 and the sub-master effects an operating change from 72 to 74, a change of the range adjustment will cause the same ratio to ensue. For example, an adjustment change of one degree from 69 to 70 in the master thermostat will effect an operating change in the sub-master in the same ratio, that is, from 73 to 75, or any other similar shift of adjustment range.

The invention will be more readily understood by reference to the accompanying drawing, in which Fig. 1 is a longitudinal sectional view through a device constructed in accordance with my invention;

Fig. 2 is a sectional view somewhat reduced in size on the line 2—2 of Fig. 1, and Fig. 3 is a view identical with the upper part of Fig. 1 except that the ratio changing mechanism has been reversed.

In Fig. 1, I have shown a conventional form of thermostat device comprising a housing 10 containing a longitudinally expansible thermostatic element 11, the expansion and contraction of which controls the valve 13 through the non-expansible rod 11a. A spring 14 tends to open this valve and is resisted by a spring pressed plunger 15 carried by a stem 16 passing through a bushing 17 in the body member of casing 18, the bushing carrying a small sealing diaphragm 19. The air controlled by the valve 13 is admitted through the coiled tube 21. Air escaping past the valve 13 enters the chamber 22, where it may affect the sealing diaphragm, thence outwardly through the opening 23 to a heat controlling valve.

The control mechanism, acting under the influence of the master thermostat is also shown in Fig. 1 and is supported on a bracket 24 formed as a part of the casting 18. The side extensions 10a on the housing or shell 10 are connected to the bracket 24 through the lugs 24a and screws 24b. Mounted on this bracket is a housing 25 containing a large bellows 26 having an air connection to the master thermostat, not shown. An adjusting screw 28 is mounted at the center of the back of the bellows, this screw contacting an arm of the lever 29. The movement of the arm and bellows is resisted by a coil spring 30 and the bellows is additionally resisted by spring 31 adjustably held in the screws 32 that project through the bracket 24.

The term "direct acting" or "reverse acting" as applied to the construction herein disclosed, is intended to designate the relation of the master to the sub-master thermostat; for example, where the space containing the master thermostat increases in temperature and the adjustment of the sub-master brings about an increased temperature in the space within which the sub-master is mounted, this is to be understood as a direct acting arrangement. Where, however, an increase in temperature in the space occupied by the master thermostat results in a lower temperature in the space controlled by the sub-master, this is understood as reverse acting.

In Fig. 1 the arm 29 has a fulcrum on a pin 45 in the angle midway in its length, the pin being seated in the bracket 47. This serves to form a lever of the first order. The ratio changing screw 36, having a generally spherical head 37, projects through the angle in the arm 29 and may be held in an adjusted position by means of the set screw 38. This head 37 has a bearing on a short arm 39 fulcrumed at 40 on the bracket 35 and carrying a boss 41 through which the range adjusting screw or shaft 42 extends. This screw carries a pointer 43 that acts as an indicator on a dial 44. The inner end of the screw 42 contacts the outer surface of the sealing diaphragm 19 and the thrust of the screw 42 and its connected parts is transmitted through the diaphragm to the plunger 15 and the valve 13.

When the parts are positioned as described an increase in temperature in the master thermostat will result in an increase in pressure in the bellows 26 and a motion of the arm 29 about the fulcrum 45. This will effect a movement of that portion of the arm 29 above the fulcrum to the left, thereby relieving the pressure on the thermostat adjustment. Consequently the valve 13 will be more widely opened thus admitting air into the passage 23 and closing the heat controlling valve connected thereto. As the space within which the thermostat 11 is mounted is cooled, the element will contract thereby tending to close the air valve 13.

In positioning the device for operation of the heat controlling valve reversely to that just described, the fulcrum pins 45 and 40 are changed as shown in Fig. 3, thus forming a lever of the second order. In that construction the arm 29 is fulcrumed at 33 and the shorter arm 39 is fulcrumed at 46 on the bracket 47 that carries the fulcrum pin 46. Likewise, the screw 36 is moved to the upper end of the arm 29 passing through the projection 34 thereof. In other words, the parts described are identical in both constructions except that they occupy reverse positions in order to effect direct or reverse action of the heat controlling valve.

In Fig. 1 the numerals 33 and 46 indicate merely apertures through which a pivot pin may be extended and in Fig. 3 the numerals 40, 45 likewise indicate apertures for the accommodation of the pivot pins.

It will be noted that the range adjustment screw serves to effect a change of the range of temperature regardless of the ratio at which the device operates. Of course, other adjustments provide for fine control of temperatures, but as they form no essential part of this invention they are not specifically described.

The operation is as follows:

Assuming the inlet 20 connected to a source of air under pressure and the outlet 23 connected to a diaphragm-operated heat-controlling valve in which the valve is closed by air pressure, and opened by a spring. A reduction of temperature in the space occupied by the thermostat 11 will tend to partially close the valve 13. Air will then cease to pass to the diaphragm valve and will waste out at valve 23a and begin to open the heat controlling valve.

The operation will be better understood by reference to Snediker Patent No. 1,530,917 of March 24, 1925 in which the thermostatic element shown in Fig. 2 of that patent is very similar. In the patented construction the air that passes the spring pressed valve passes through a pipe to a steam valve, this thermostatic element being the so-called sub-master, the adjustment of which may be changed by the master thermostat shown at 14 in Fig. 1 of the identified patent and in detail in Fig. 3 of said patent. The operation so far as the master and sub-master thermostats is concerned, is identical with the operation and performed by the instrument disclosed herein. However, it will be noted that in the patented construction a variation reflected in the master thermostat will be correspondingly reflected in the sub-master; in other words, it is not possible by that apparatus to effect say a five degree change in the sub-master for each one degree in the master, or vice versa, at the will of the operator, and that is accomplished in the present apparatus by means of the ratio changing device heretofore described. For example, in the construction of Fig. 1, the arms 29—39 fulcrumed at 45—40, an increase of pressure in the air line from the master thermostat will result in a movement of the arm 29 to the right and by this movement will, through the rounded head 37 of the ratio screw 36 transmit a force to the short arm 39 and thence to the end of the stem 16. Inasmuch as the thermostatic element is incompressible, the spring 15a mounted within the head of the stem and backing up the plunger 15 will be compressed. This spring 15a is much stronger than the spring 14 surrounding the valve 13, and therefore, no outward movement of the valve will take place until the spring 15a has been expanded to a point that will permit the plunger and stem to be retracted, this taking place when, due to a reduction in the air pressure from the master thermostat the bellows 26 is permitted to contract.

It will be noted that the bellows 26 is of relatively very large diameter and the springs resisting the movement thereof are of relatively large size and strength. This is for two purposes. First, in order to provide relatively great power to eliminate errors due to inertia and friction in the mechanism of the sub-master thermostat, and second, in order to neutralize the varying pressure that will occur in the sealing diaphragm 19. This sealing element is of small diameter and the force exerted thereby, even under varying air conditions, therein will be inconsequential relative to the force exerted by the large bellows.

For opposite action of the sub-master thermostat, the mounting of the arms 29—39 and the ratio screw 36 are reversed as shown in Fig. 3, one mounting being intended for a direct acting sub-master thermostat and the other for a reverse acting sub-master.

In case of reversal of the arms 29—39 the shaft 42 is not changed in the arm 39, but the pointer is freed and restored to an operating position by swinging it 180 degrees.

An important point to be noticed is that any change in the adjustment by means of the pointer 43 changes the range of adjustment without changing the ratio as between the master and sub-master. This is an important advantage, as it frequently occurs that for a desired change in the master a corresponding change without variation of the ratio is desired in the sub-master.

Another important point to be noticed is that by changing the fulcrum point of the arms 29—39 the power of the bellows 26 may be augmented or decreased and that by shifting the screw fulcrum 37 this power may be varied to secure a wide ratio of difference. This enables a high degree of flexibility of operation of the device in order to meet widely varying requirements of operation.

Wherever in the specification or claims I have referred to a bellows it will be understood that this is intended as a generic term covering any movable wall such as a diaphragm or piston.

I claim:—

1. In combination, a thermostatic element, a valve operated thereby for controlling a supply of heat, means for controlling the adjustment of said thermostat relative to its valve, said means including a bellows, motion-multiplying means between said bellows and said valve adjustment, and means for varying the ratio of motion multiplication.

2. In combination, a thermostat having a valve, said valve controlling a supply of fluid under pressure and means for varying the adjustment of said valve, said means including a bellows, a lever operated by the bellows for transmitting the power exerted by the bellows to said valve adjustment, and means associated with said lever for varying the ratio of the power transmitted from the bellows to the valve adjustment.

3. In combination, a thermostat, a valve controlled thereby for regulating the delivery of fluid under pressure, a bellows mounted adjacent to said thermostat and adapted to be affected by the fluid under pressure delivered from a second thermostat, a motion-multiplying lever between said bellows and said valve, and means for varying the degree of motion-multiplication in said lever.

4. In combination, a thermostat, a valve controlled thereby for regulating the delivery of fluid under pressure, a bellows mounted adjacent to said thermostat and adapted to be affected by the fluid under pressure delivered from a second thermostat, a motion-multiplying lever between said bellows and said valve, and means for changing said lever from one of the first order to one of the second order whereby to reverse the relative action between the bellows and the valve adjustment.

5. In combination, a thermostat, a valve controlled thereby for regulating the delivery of fluid under pressure, a bellows mounted adjacent to said thermostat and adapted to be affected by the fluid under pressure delivered from a second thermostat, a motion-multiplying lever between said bellows and said valve, means for varying the degree of motion multiplication in said lever, and means for changing said lever from one of the first order to one of the second order whereby to reverse the relative action between the bellows and the valve adjustment.

6. A thermostatic device, the adjustment of which is adapted to be varied from a distance, comprising in combination a thermostatic element, an air valve controlled thereby, a plunger for controlling said valve, a bellows adapted to be connected to air under pressure from a distant control, a lever of the first order connecting said bellows and said plunger, and means for changing the leverage of said lever relative to said plunger.

7. A thermostatic device, the adjustment of which is adapted to be varied from a distance, comprising in combination a thermostatic element, an air valve controlled thereby, a plunger for controlling said valve, a bellows adapted to be connected to air under pressure from a distant control, a lever of the first order connecting said bellows and said plunger, means for changing the leverage of said lever relative to said plunger, and means for changing said lever from one of the first order to one of the second order whereby to reverse the relative action of the parts.

8. A thermostatic device, the adjustment of which is adapted to be varied from a distance, comprising in combination, a thermostatic element, an air valve controlled thereby, a plunger for controlling said valve, a resilient thrust absorber on said plunger, a bellows adapted to be connected to air under pressure from a distant control, a lever of the first order connecting said bellows and said plunger, and means for changing the leverage of said lever relative to said plunger.

9. In combination, a thermostat of the longitudinally expansive type, an air valve controlled thereby, a plunger abutting said valve, a sealing diaphragm on said plunger, a motion-multiplying lever acting against said plunger, means for varying the effective length of the lever in order to vary the transmitted force exerted on said plunger, a relatively large bellows adapted to be controlled by fluid pressure from a distant source, said bellows acting on said lever to effect the adjustment of said thermostat.

10. In combination, a thermostat of the longitudinally expansive type, an air valve controlled thereby, a plunger abutting said valve, a sealing diaphragm on said plunger, a motion-multiplying lever acting against said plunger, means for varying the effective length of the lever in order to vary the transmitted force exerted on said plunger, a relatively large bellows adapted to be controlled by fluid pressure from a distant source, said bellows acting on said lever to effect the adjustment of said thermostat, and means for changing said lever from one of the first order to one of the second order.

11. In combination, a thermostat within a space to be heated and adapted to control a supply of heat to said space, a second thermostat remotely located and subject to the temperature of a different space, means for changing the adjustment of the first thermostat by the second thermostat, and manually operable means for varying the ratio of change of said adjustment whereby a given force exerted by said second thermostat may be varied to effect an increased or lessened force tending to adjust the said first thermostat and means for changing the position of the parts of the second thermostat whereby the given force exerted by the first thermostat may selectively effect an adjustment either for a raised temperature or a lowered temperature control by said second thermostat.

MORTON O. SNEDIKER.